(12) United States Patent
Sano et al.

(10) Patent No.: US 9,527,228 B2
(45) Date of Patent: Dec. 27, 2016

(54) METHOD FOR PRODUCING FOAM-MOLDED ARTICLE, AND FOAM-MOLDED ARTICLE

(71) Applicant: KYORAKU Co., Ltd., Kyoto (JP)

(72) Inventors: Takeru Sano, Yamato (JP); Yu Igarashi, Yamato (JP); Yuki Arita, Yamato (JP); Takashi Nomura, Yamato (JP)

(73) Assignee: KYORAKU CO., LTD., Kyoto-Shi, Kyoto (JP)

( * ) Notice: Subject to any disclaimer, the term of this patent is extended or adjusted under 35 U.S.C. 154(b) by 180 days.

(21) Appl. No.: 14/374,595

(22) PCT Filed: Jan. 21, 2013

(86) PCT No.: PCT/JP2013/051049
§ 371 (c)(1),
(2) Date: Jul. 25, 2014

(87) PCT Pub. No.: WO2013/111692
PCT Pub. Date: Aug. 1, 2013

(65) Prior Publication Data
US 2015/0045467 A1 Feb. 12, 2015

(30) Foreign Application Priority Data

Jan. 26, 2012 (JP) .................................. 2012-014400
Feb. 27, 2012 (JP) .................................. 2012-040422

(51) Int. Cl.
| | | |
|---|---|---|
| *C08J 9/228* | (2006.01) | |
| *B29C 44/02* | (2006.01) | |
| *B29C 49/00* | (2006.01) | |
| *B29C 44/08* | (2006.01) | |
| *C08J 9/00* | (2006.01) | |
| *C08J 9/12* | (2006.01) | |
| *B29C 49/04* | (2006.01) | |
| *B29K 105/04* | (2006.01) | |
| *B29K 23/00* | (2006.01) | |

(52) U.S. Cl.
CPC .............. *B29C 44/02* (2013.01); *B29C 44/08* (2013.01); *B29C 49/0005* (2013.01); *C08J 9/0061* (2013.01); *C08J 9/122* (2013.01); *C08J 9/228* (2013.01); *B29C 49/04* (2013.01); *B29K 2023/06* (2013.01); *B29K 2023/10* (2013.01); *B29K 2023/16* (2013.01); *B29K 2105/04* (2013.01); *B29K 2223/06* (2013.01); *B29K 2223/12* (2013.01); *C08J 2201/026* (2013.01); *C08J 2201/03* (2013.01); *C08J 2203/06* (2013.01); *C08J 2203/08* (2013.01); *C08J 2205/052* (2013.01); *C08J 2207/00* (2013.01); *C08J 2300/22* (2013.01); *C08J 2300/26* (2013.01); *C08J 2323/10* (2013.01); *C08J 2323/12* (2013.01); *C08J 2353/00* (2013.01); *C08J 2423/08* (2013.01); *C08J 2423/10* (2013.01); *C08J 2453/00* (2013.01)

(58) Field of Classification Search
CPC ...... B29C 44/02; B29C 44/08; B29C 49/0005; B29C 49/04; C08J 9/0061; C08J 9/122; C08J 9/228; C08J 2201/026; C08J 2201/03; C08J 2203/06; C08J 2205/052; C08J 2207/00; C08J 2300/22; C08J 2300/26; C08J 2323/10; C08J 2323/12; C08J 2353/00; C08J 2423/08; C08J 2423/10; C08J 2453/00; B29K 2023/06; B29K 2023/10; B29K 2023/16; B29K 2105/04; B29K 2223/06; B29K 2223/12
See application file for complete search history.

(56) References Cited

U.S. PATENT DOCUMENTS

| | | | |
|---|---|---|---|
| 5,391,618 A | * | 2/1995 | Yamamoto ............ C08F 297/08 525/240 |
| 2006/0065992 A1 | | 3/2006 | Hutchinson et al. |
| 2006/0073294 A1 | | 4/2006 | Hutchinson et al. |
| 2006/0073298 A1 | | 4/2006 | Hutchinson et al. |
| 2011/0048571 A1 | | 3/2011 | Onodera |
| 2011/0244217 A1 | | 10/2011 | Matsushita |
| 2011/0244223 A1 | | 10/2011 | Matsushita |
| 2013/0032963 A1 | | 2/2013 | Tokiwa |

(Continued)

FOREIGN PATENT DOCUMENTS

| | | |
|---|---|---|
| EP | 2261004 A1 | 12/2010 |
| EP | 2551088 A | 1/2013 |

(Continued)

OTHER PUBLICATIONS

Qiu Guixue, Wu Renjie,"Study on Glass Fiber Reinforced Polypropylene Modified with Metallocene Polyethylene Elastomer", Engineering Plastics Applications, 2001.2, 29(2): 5-8.

(Continued)

*Primary Examiner* — Irina S Zemel
(74) *Attorney, Agent, or Firm* — Troutman Sanders LLP

(57) ABSTRACT

Even when a mixture resin of virgin resin and recovered resin material is used as a resin material for molding, a stable, high-quality foam-molded article with excellent impact resistance is produced at low cost. For this, the resin material that is used includes a mixture resin of recovered resin material obtained by pulverizing a resin material solidified after melting, and virgin resin without thermal history of melting, and a foaming agent added to the mixture resin. The resin material is a mixture of a polypropylene-based resin and a polyethylene-based elastomer.

6 Claims, 1 Drawing Sheet

(56) References Cited

U.S. PATENT DOCUMENTS

2013/0313749 A1  11/2013  Onodera
2013/0323448 A1  12/2013  Onodera

FOREIGN PATENT DOCUMENTS

| GB | 1008568 A | | 10/1965 |
|---|---|---|---|
| JP | S63-237924 | | 10/1988 |
| JP | 2006116818 A | * | 11/2006 |
| JP | 2007-532363 | | 11/2007 |
| JP | 2010-070624 | | 4/2010 |
| JP | 2010-121054 A1 | | 6/2010 |
| JP | 2011-051180 | | 3/2011 |
| JP | 2011-201085 A | | 10/2011 |
| JP | 2011-213966 | | 10/2011 |
| WO | 2005/102668 | | 11/2005 |

OTHER PUBLICATIONS

International Search Report dated May 7, 2013, which issued during prosecution of International Application No. PCT/JP2013/051049.

* cited by examiner

METHOD FOR PRODUCING FOAM-MOLDED ARTICLE, AND FOAM-MOLDED ARTICLE

CROSS-REFERENCE TO RELATED APPLICATIONS

This is a U.S. national phase application under 35 U.S.C. §371 of International Patent Application No. PCT/JP2013/051049 filed on Jan. 21, 2013, and claims benefit of priority to Japanese Application No. 2012-014400 filed Jan. 26, 2012 and Japanese Application No. 2012-040422 filed Feb. 27, 2012. The International Application was published on Aug. 1, 2013, as International Publication No. WO 2013/111692 under PCT Article 21(2). The entire contents of these applications are hereby incorporated by reference.

TECHNICAL FIELD

The present invention relates to a method for producing a foam-molded article by mixing virgin resin with a recovered resin material, and to a foam-molded article.

BACKGROUND ART

Generally, for molding of resin-molded articles, a molding method in which thermoplastic resin in molten state is sandwiched between split mold blocks and molded has been widely used.

In such molding method, the resin material is brought into a molten state and then clamped with split mold blocks. The molds are then opened, releasing a molded article. Subsequently, the molded article is subjected to removal of burrs from the exterior or the like of the molded article with a cutter or the like to give a finished article.

Such a general molding method causes an undesired resin portion other than the finished article itself, which is the so-called burr or the like, on the exterior or the like of the finished article with respect to a resin material that has solidified by cooling after molding.

The resin portion other than the finished article has the thermal history of having been heated during molding for producing molten state and then solidified by cooling. Thus, the physical properties of such resin that can be expressed numerically, such as melt tension (MT), melt flow rate (MFR), and Izod impact strength, are in many cases degraded compared with those of virgin resin without thermal history.

From the viewpoint of resource saving and cost reduction, the mass-production of a resin-molded article carries out a repetitive cycle of pulverizing a resin portion other than the finished article, which has been generated in molding, recovering it as a recovered resin material; mixing the recovered resin material with virgin resin to obtain base material resin, and making it in a molten state, followed by molding for producing a subsequent resin-molded article.

In many cases, therefore, the resin material, which is used in a production cycle for mass production of the resin-molded article, causes decreases in its numerically expressed physical properties, such as MT, MFR, and Izod impact strength, compared with the case of using only virgin resin without thermal history.

Hence, the selection of a resin for molding is generally performed such that a resin with high physical properties can be selected to have sufficient properties even in a state of being mixed with recovered resin material and having degraded physical properties compared with virgin resin.

If the numerically expressed physical properties, such as MT and MFR, are degraded and drop below certain lines, pinholes may be formed when, during molding, the resin material in molten state is greatly extended so as to conform to the irregularities of the mold surface.

Further, a change in fluid property or carbonization of the resin may appear, and may therefore lead to a problem of, for example, an uneven wall thickness or surface degradation of the resin due to drawdown in blow molding.

Further, in the case of foamed resin, the foamed cells may be defoamed during cell growth. Thus, if the foamed cells are defoamed in this way, the expansion ratio is lowered and hardy becomes high.

One of techniques provided by the present applicant includes, for the purpose of molding for producing a light-weight foam-molded article with excellent impact resistance using a mixture resin including a polypropylene-based resin for foaming and a hydrogenated styrene-based thermoplastic elastomer, and making the styrene content of the hydrogenated styrene-based thermoplastic elastomer 15 to 25 wt % (see, for example, Patent Literature 1).

CITATION LIST

Patent Literature

Patent Literature 1: JP-A-2011-51180

SUMMARY OF INVENTION

Problems to be Solved by the Invention

However, resins with high physical properties are generally expensive.

Thus, there is a problem of increasing material costs for production of a foam-molded article when a resin with high physical properties is selected as a material resin so that high physical properties can be imparted to a molded article produced by molding a mixture resin of virgin resin and recovered resin material.

Further, when a foam-molded article is provided with a high expansion ratio so as to be reduced in weight for use in an on-board component or the like, the foam-molded article tends to cause a decrease in impact resistance at low temperature.

In Patent Literature 1 discussed above, there is no consideration on measures for mitigating the degradation of physical properties due to the use of such a recovered resin material.

The present invention has been made in view of such circumstances. The present invention intends to provide a method for producing a stable, high-quality foam-molded article with excellent impact resistance at low cost even in the case of using a mixture resin of virgin resin and recovered resin material as a resin material for molding, and to provide such a foam-molded article.

Solutions to the Problems

In order to achieve the above intention, a method for producing a foam-molded article according to the present invention includes molding a resin material in molten state by clamping with split mold blocks. The resin material is prepared by adding a foaming agent to a mixture resin of a recovered resin material obtained by pulverizing a resin material that has solidified after melting and a virgin resin without thermal history of melting; and provided as a mixture of a polypropylene-based resin and a polyethylene-based elastomer.

A foam-molded article according to the present invention is a foam-molded article molded by clamping a resin material in molten state with split mold blocks. The resin material is prepared by adding a foaming agent to a mixture resin of a recovered resin material obtained by pulverizing a resin material that has solidified after melting and a virgin resin without thermal history of melting; and provided as a mixture of a polypropylene-based resin and a polyethylene-based elastomer.

Effects of the Invention

Thus, according to the present invention, even when a mixture resin of virgin resin and recovered resin material is used as a resin material for molding, a stable, high-quality foam-molded article with excellent impact resistance can be produced at low cost.

DESCRIPTION OF EMBODIMENTS

Figure 1:
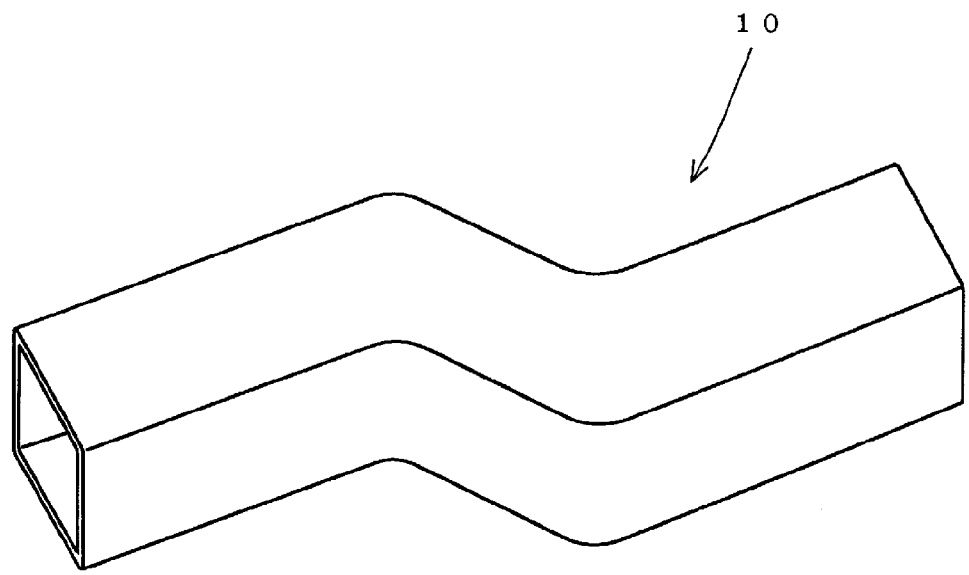
FIG. 1 is a perspective diagram illustrating an example of a duct 10 according to an embodiment of the present invention.

A method for producing a foam-molded article according to the present invention, and a foam-molded article will be described in detail with reference to an embodiment applied to a vehicle air-conditioning duct, while referring to the drawings.

The present invention is not limited to the vehicle air-conditioning duct and may be applied to other foam-molded articles, such as automobile interior components including door panels, instrument panels, or vehicle deck boards, home interior wall materials, electronic device housings, and ducts for supplying gases or liquids for purposes other than vehicles.

A duct 10 according to the embodiment of the present invention illustrated in FIG. 1 is configured to cause air-conditioning air supplied from an air conditioner unit (not shown) to circulate via a flow passageway in the duct so as to ventilate a desired location.

The shape of the duct 10 according to the present embodiment is not limited to one illustrated in FIG. 1, and may include any shape adapted to the use of the duct 10, its location, and the like.

The duct 10 according to the present embodiment can be obtained by sandwiching a foamed parison, which is formed by extruding a foamable resin from an annular die of an extruder, with a mold, and then blow molding the foamed parison. The duct immediately after blow molding has both its ends closed. The ends of the duct are cut by trimming after blow molding to obtain openings. Blow molding will be described later.

The duct 10 according to the present embodiment is constructed of a hollow foam-molded article with a tube wall having a foaming layer. Having such a closed cell structure can give a lightweight duct with excellent thermal insulating properties. The closed cell structure is a structure having a plurality of foamed cells with a closed cell content of at least 70% or more.

The above structure can almost eliminate the possibility of dew condensation even when cooling air is circulated in the duct.

The duct 10 according to the present embodiment is also obtained by using a mixture resin of recovered resin material and virgin resin as a base material resin, and foam-blow molding the base material resin while adding a foaming agent thereto.

When a resin-molded article is molded by conventional blow molding, the resin material in molten state is formed in the shape of the mold surface, and then released from the mold in a cooled and solidified state. Subsequently, burrs, openings, and the like around the molded article are cut by a cutter and the like to obtain a finished article. In a production cycle for mass production by blow molding, from the viewpoint of saving resources and cost reduction, these portions of the resin material that has solidified after having been placed in a molten state other than the finished article are pulverized to provide the recovered resin material. The recovered resin material is mixed with virgin resin without thermal history to obtain a mixture resin, which is used for blow molding again while a foaming agent is added thereto.

In such a production cycle for mass production, the ratio of the recovered resin material in the resin material used for molding may be as high as 70% to 90% in some cases. After blow molding, about 10% to 30% of virgin resin with respect to the resin material as a whole is added to the recovered resin material from the blow molding for the foam-molded article that is obtained as a finished article. The resultant mixture resin is used for blow molding again.

The production cycle of performing blow molding, adding virgin resin to the recovered resin material from blow molding to obtain the mixture resin, and then performing blow molding again is repeated. Thus, the properties of the foam-molded article obtained by the molding using the mixture resin are in many cases degraded compared with the properties of a foam-molded article molded using only virgin resin.

To test and verify the property degradation of the resin material, the present inventors compared the properties of a test piece with one cycle of thermal history that was fabricated by extruding only virgin resin in molten state from the extruder, with the properties of a test piece with three cycles of thermal history. The test piece with three cycles of thermal history was fabricated by melting virgin resin, melting the resin material after solidification and pulverization, and again melting the resin material after solidification and pulverization, followed by solidification.

The extruder for providing thermal history is operated under the following extrusion conditions:

The rotational speed of the screw in the extruder is 60 rpm, and the extrusion opening has a slit shape measuring 25 mm×1 mm. The temperature inside the extrusion device is adjusted so that the extrusion output is within a range of 15 to 25 kg/h. As the resin is extruded from the extrusion opening, the extruded resin in sheet shape is sandwiched between metal plates, thereby cooling and solidifying the resin. In this way, the first cycle of thermal history is provided.

In the duct 10 according to the present embodiment, in accordance with the result of the property degradation verification test, the resin for use is selected such that (MT×MFR in the test piece with three cycles of thermal history)/(MT×MFR in the test piece with one cycle of thermal history)≥0.4. If this is less than 0.4, it would be meaningless to provide high physical properties by using expensive material, and it is considered that such resin is unsuitable for producing a stable, high-quality foam-molded article at low cost.

The melt tension (MT) indicates the following tension. That is, the tension is an exerted tension that is measured by a melt tension tester (manufactured by Toyo Seiki Seisaku-Sho, Ltd.) when a strand extruded from an orifice with a diameter of 2.095 mm and a length of 8 mm at residual heat temperature of 230° C. and extrusion rate of 5.7 mm/min was wound on a roller with a diameter of 50 mm at a winding rate of 100 rpm.

The melt flow rate (MFR) is a value measured according to JIS K-7210.

In the duct 10 according to the present embodiment, a resin with a material composition of a polypropylene-based resin mixed with a reforming material is selected. Thus, compared with the case of a material composition that is not mixed with a reforming material, degradation of the Izod impact strength does not occur and a decrease in MT×MFR can also be suppressed.

The Izod impact strength is measured as follows. A wall portion of a cut-out sample is stored at −30° C. for 24 hours or longer. Thereafter, a test piece of 80×10 (length in mm×width in mm) with a thickness of 4 mm is cut out from the wall portion. The Izod impact strength is measured using overlapping test pieces according to JIS K-7110 (with notches).

Thus, the mixture resin of a polypropylene-based resin mixed with a reforming material is used as the virgin resin. As the reforming material, a polyethylene-based elastomer is used. Preferably, the polyethylene-based elastomer as the reforming material is compounded with a compounding ratio of 3 to 15% by weight of the mixture resin.

If the compounding ratio is outside this range, the Izod impact strength in the test piece with three cycles of thermal history may become lower than the Izod impact strength in the case of the test piece with one cycle of thermal history compared with if the ratio is within the range.

As the polypropylene-based resin, a polypropylene-based resin for foaming to which another polypropylene-based resin for dilution is added is used.

Preferably, the polypropylene-based resin for foaming is a polypropylene resin including a propylene homopolymer with a long-chain branching structure.

Preferably, the propylene homopolymer with the long-chain branching structure is a propylene homopolymer with a weight average branching index of 0.9 or less. The weight average branching index g is expressed by V1/N2, where V1 is the limiting viscosity number of a branched polyolefin, and V2 is the limiting viscosity number of a linear polyolefin having the same weight average molecule weight as the branched polyolefin.

Examples of the other polypropylene-based resin for dilution include, for example, a homopolymer of propylene, a copolymer of propylene and one or two types of α-olefin with the carbon number of 2 to 20, and a mixture of a homopolymer of propylene and another thermoplastic resin. The polypropylene-based resin refers to a resin with a propylene content of 85 mol % or more.

The polyethylene-based elastomer refers to an elastomer with an ethylene content of 50 wt % or more. In such a polyethylene-based elastomer, it is preferable that the melt flow rate (MFR) at 190° C. is 3 or more. By using a polyethylene-based elastomer having the MFR in this range, the following three conditions can be satisfied.

(1) The Izod impact strength in the test piece with three cycles of thermal history is higher than the Izod impact strength in the test piece with one cycle of thermal history.
(2) The Izod impact strength in the test piece with three cycles of thermal history is 4.0 kJ/m$^2$ or more.
(3) MT×MFR in the test piece with three cycles of thermal history is 160 mN·g/10 min or more.

It is further preferable that the polyethylene-based elastomer has a density of less than 0.87 g/cm$^3$. By using a polyethylene-based elastomer with the MFR in the above range and the density less than 0.87 g/cm$^3$, the following condition in addition to the above three conditions can be satisfied.
(4) The Izod impact strength in the test piece with three cycles of thermal history is 4.5 kJ/m$^2$ or more.

The base material resin is foamed by using a foaming agent prior to blow molding.

Examples of the foaming agent include inorganic foaming agents such as air, carbon dioxide, nitrogen gas, or water, and organic foaming agents such as butane, pentane, hexane, dichloromethane, or dichloroethane.

Among those, it is preferable to use air, carbon dioxide, or nitrogen gas as the foaming agent. In this case, mixing of tangible material can be prevented, whereby a decrease in durability and the like can be suppressed.

Preferably, the foaming method uses a supercritical fluid. Namely, it is preferable to foam the mixture resin using carbon dioxide or nitrogen gas in supercritical state. In this case, cells can be formed uniformly and reliably.

When the supercritical fluid is nitrogen gas, the conditions may include a critical temperature of −149.1° C. and a critical pressure of 3.4 MPa or above. When the supercritical fluid is carbon dioxide, the conditions may include a critical temperature of 31° C. and a critical pressure of 7.4 MPa or above.

By blow molding the foaming-processed base material resin by a known method, the duct 10 according to the present embodiment is molded.

Figure 2:
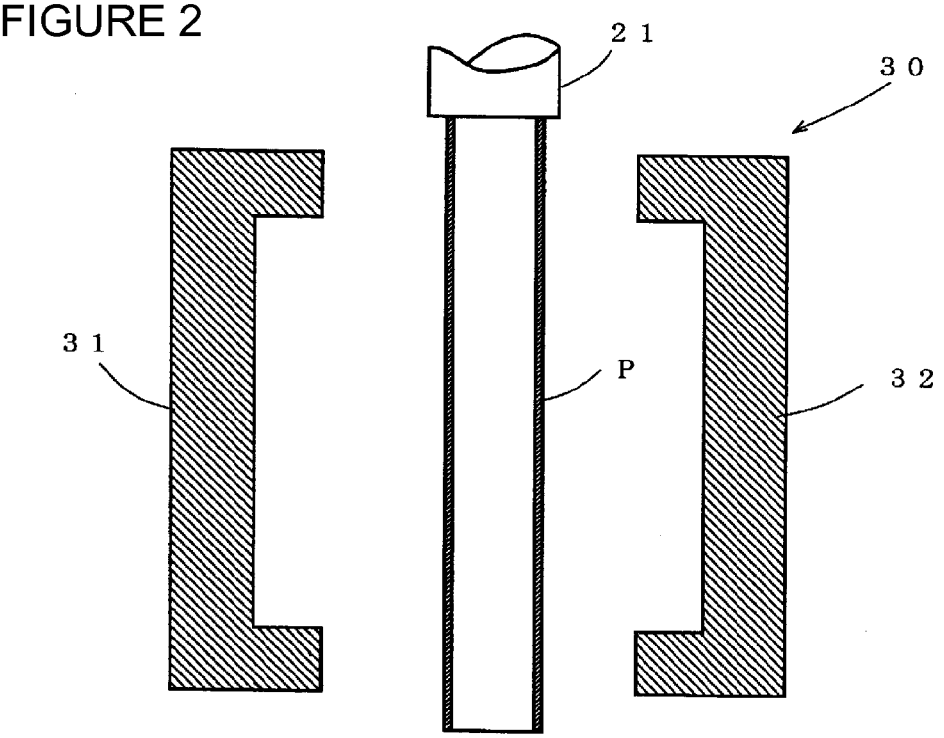
FIG. 2 is a cross-sectional diagram illustrating an embodiment of blow molding of the duct 10 illustrated in FIG. 1.

FIG. 2 is a cross sectional view illustrating the blow molding of the duct 10 according to the present embodiment.

First, the base material resin is prepared by kneading the resin material for molding in the extruder. When only virgin resin is used for molding, the base material resin is prepared by kneading virgin resin of the polypropylene-based resin and virgin resin of the reforming material including the polyethylene-based elastomer at a predetermined ratio.

When a mixture resin of virgin resin and recovered resin material is used as the resin material, the base material resin is prepared by adding a predetermined ratio of virgin resin to pulverized recovered resin material and then kneading.

To the base material resin, the foaming agent is added, and the base material resin is mixed in the extruder and then accumulated in an accumulator in the die (not shown). After a predetermined amount of the resin is accumulated, a ring-shaped piston (not shown) is pressed vertically downward with respect to the horizontal direction.

Then, the resin is extruded out of the die slit of an annular die 21 illustrated in FIG. 2 in the form of a cylindrical parison P at an extrusion rate of 700 kg/h or more, between a split mold block 31 and a split mold block 32 of a clamping machine 30.

Thereafter, the split mold blocks 31 and 32 are clamped, thus sandwiching the parison P. Air is then blown into the parison P in a range of from 0.05 to 0.15 MPa so as to form the duct 10.

After the molding, portions of the cooled and solidified resin material other than the finished article are pulverized, thus obtaining recovered resin material. To the recovered resin material, a predetermined ratio of virgin resin is added to obtain a mixture resin, which is used in performing blow molding again as set forth above. By repeating such a production cycle, the duct 10 can be mass-produced.

The foam-molded article may be molded not just by the blow molding described above but also by vacuum molding. Vacuum molding involves molding for producing a predetermined shape of molded article by suctioning the extruded parison onto the mold. Alternatively, the foam-molded article may be molded by compression molding. Compression molding involves sandwiching the extruded parison by molds and then molding without performing the blowing of air or suctioning.

As set forth above, the duct 10 according to the present embodiment is produced using a mixture resin of recovered resin material and virgin resin as the base material resin, and performing foam-blow molding while adding a foaming agent into the base material resin.

According to the present embodiment, as the resin material for the duct 10, the mixture resin of the polypropylene-based resin mixed with the reforming material including a polyethylene-based elastomer is used, as set forth above. In this way, compared with the case of a material composition without the mixture of a reforming material, degradation of the Izod impact strength does not occur, and a decrease in MT×MFR can also be suppressed.

Further, by compounding the polyethylene-based elastomer as the reforming material at the compounding ratio of 3 to 15% by weight of the mixture resin, the duct 10 can be obtained where the Izod impact strength in the test piece with three cycles of thermal history does not become lower than the Izod impact strength in the test piece with one cycle of thermal history.

One reason that such effect can be obtained by compounding the polyethylene-based elastomer as the reforming material is that the molecular structures of the polypropylene-based resin are cross-linked when subjected to thermal history due to the introduction of a number of comonomers in the elastomer.

If the compounding ratio of the polyethylene-based elastomer with respect to the mixture resin is less than 3%, the cross-linked structures are reduced and therefore the above effect is not fully obtained. If the compounding ratio is greater than 15%, the cross-linking by the comonomers becomes dominant, and further gelation occurs with each addition of thermal history, resulting in hardening. As a result, the impact resistance improving effect is also gradually lost.

A polypropylene-based elastomer, if compounded used as the reforming material, would be dissolved in the polypropylene-based resin as a primary foam material. Thus, the above-described effect would not be obtained.

If a polyethylene-based resin or a styrene-ethylene/butylene-styrene block copolymer (SEBS) is used as the reforming material, it would be difficult to form the above-described cross-linked structure, and the above effect would not be obtained.

By using the polyethylene-based elastomer where the MFR at 190° C. is 3 or more as the reforming material according to the present embodiment, the duct 10 that satisfies the following three conditions can be obtained.
(1) The Izod impact strength in the test piece with three cycles of thermal history is higher than the Izod impact strength in the test piece with one cycle of thermal history.
(2) The Izod impact strength in the test piece with three cycles of thermal history is 4.0 kJ/m$^2$ or more.
(3) MT×MFR in the test piece with three cycles of thermal history is 160 mN·g/10 min or more.

As described in (1), because the Izod impact strength in the test piece with three cycles of thermal history is higher than the Izod impact strength in the test piece with one cycle of thermal history, a duct with sufficient impact resistance can be produced even when recovered resin material is included in the base material resin.

As described in (2), because the test piece with three cycles of thermal history has an Izod impact strength of 4.0 kJ/m$^2$ or more, a duct with sufficient impact resistance can be produced even at low temperature. Further, even when the expansion ratio is increased, sufficient impact resistance is ensured at low temperature. Thus, a lightweight duct with excellent impact resistance at low temperature can be produced.

When the recovered resin material is used at 70% or more during mass production of the foam-molded article, it is recommended that the Izod impact strength in the test piece with three cycles of thermal history be 2.5 kJ/m$^2$ or more. Thus, the condition (2) can be satisfied, enabling the mass production of a foam-molded article having sufficient impact resistance.

As described in (3), because MT×MFR in the test piece with three cycles of thermal history is 160 mN·g/10 min or more, molding property is not excessively degraded even when recovered resin material is included in the base material resin. Thus, when the resin material in molten state is foamed and extruded, the expansion ratio is not excessively lowered by defoaming of the foamed cells, and the foam-molded articles of high expansion ratio can be continuously and repeatedly produced.

Hence, even when the mold surface has large irregularities, the resin material can readily conform to the irregularities. Thus, a high-quality foam-molded article with more complex irregularities can be molded without formation of pinholes.

Further, the development of drawdown during extrusion of the resin material in molten state can be suppressed. Thus, stable mass production can be implemented.

Further, by using a polyethylene-based elastomer as the reforming material where the density is less than 0.87 g/cm$^3$, the duct 10 that satisfies the following condition in addition to the conditions (1) to (3) can be obtained.
(4) The Izod impact strength in the test piece with three cycles of thermal history is 4.5 kJ/m$^2$ or more.

Thus, the duct 10 with even better impact resistance can be produced.

Even when the recovered resin material is included in the base material resin as described above, physical properties are not excessively degraded. Thus, not only expensive materials with excellent physical properties but also less expensive materials can be considered for selection of the virgin resin. Further cost reduction can be therefore achieved.

EXAMPLES

In the following, examples and comparative examples used in the verification test of the above-described property degradation of the resin material used in the duct 10 according to the present embodiment will be described in specific terms. It should be noted, however, that the present invention is not limited to the following examples.

The polypropylene-based resin for foaming, the other polypropylene-based resin for dilution, and the polyethylene-based elastomer as the reforming material used in the examples are indicated below. In addition, the polypropylene-based elastomer as the other reforming material, the polyethylene-based resin, and the hydrogenated styrene-based thermoplastic elastomer used in the comparative example are indicated below.

<Polypropylene-Based Resin for Foaming>

PP1: propylene homopolymer (manufactured by Borealis AG; trade name "Daploy WB140")

<Other Polypropylene-Based Resin for Dilution>

PP2: block polypropylene A (manufactured by Japan Polypropylene Corporation; trade name "NOVATEC BC8")

PP3: block polypropylene B (manufactured by Japan Polypropylene Corporation; trade name "FTS3000")

PP4: block polypropylene C (manufactured by Japan Polypropylene Corporation; trade name "NEWFOAMER FB3312")

PP5: block polypropylene D (manufactured by Sumitomo Chemical Co., Ltd.; trade name "NOBLEN AH561")

PP6: block polypropylene E (manufactured by Japan Polypropylene Corporation; trade name "NOVATEC EC9")

PP7: block polypropylene F (manufactured by Japan Polypropylene Corporation; trade name "NOVATEC EA9FT")

PP8: block polypropylene G (manufactured by Honam Petrochemical Corp.; trade name "J320")

<Polyethylene-Based Elastomer as the Reforming Material>

TPE1: ethylene α-olefin copolymer (manufactured by Mitsui Chemicals, Inc.; trade name "TAFMER A0550S")

TPE2: ethylene α-olefin copolymer (manufactured by Mitsui Chemicals, Inc.; trade name "TAFMER A-4050S")

TPE3: ethylene α-olefin copolymer (manufactured by Mitsui Chemicals, Inc.; trade name "TAFMER A-4085S")

TPE4: ethylene α-olefin copolymer (manufactured by Dow Chemical Company; trade name "ENGAGE 8180")

<Other Reforming Material>

TPE5: polypropylene-based elastomer (manufactured by Mitsui Chemicals, Inc.; trade name "TAFMER XM-7070")

TPE6: linear short chain-branched polyethylene (LLDPE) (manufactured by Sumitomo Chemical Co., Ltd.; trade name "Excellen FX201")

TPE7: styrene-ethylene/butylene-styrene block copolymer (SEBS)(manufactured by Asahi Kasei Chemicals Corporation; trade name "Tuftec H1053")

Table 1 shows MT (melt tension)(mN), MFR (melt flow rate)(g/10 min), MT×MFR (mN·g/10 min), and density (g/cm$^3$) of the above resins.

With regard to PP1 to PP8, the melt tension (MT) is as indicated below. Namely, the tension was the exerted tension measured with a melt tension tester (manufactured by Toyo Seiki Seisaku-Sho, Ltd.) when a strand extruded from an orifice with a diameter of 2.095 mm and a length of 8 mm at a residual heat temperature of 230° C. and an extrusion rate of 5.7 mm/min was wound on a roller with a diameter of 50 mm at a winding rate of 100 rpm.

With regard to TPE1 to TPE7, the values are in the case of a residual heat temperature of 210° C.

With regard to PP1 to PP8, the melt flow rate (MFR) indicates values measured according to JIS K-7210 at a test temperature of 230° C. and with a test load of 2.16 kg.

With regard to TPE1 to TPE7, the MFR indicates values measured according to JIS K-6922-1 at a test temperature of 190° C. and with a test load of 2.16 kg.

The density indicates values measured at normal temperature (23° C.).

TABLE 1

| | | MT (mN) | MFR (g/10 MIN) | MT × MFR (mN · g/10 MIN) | DENSITY |
|---|---|---|---|---|---|
| PRIMARY FOAM MATERIAL | PP1 | 239.4 | 4.05 | 969.6 | 0.9 |
| DILUTING MATERIAL | PP2 | 35.7 | 1.7 | 60.7 | 0.9 |
| | PP3 | 8.5 | 9.18 | 78.0 | 0.9 |
| | PP4 | 76.1 | 2.43 | 184.9 | 0.9 |
| | PP5 | 7.7 | 2.9 | 22.3 | 0.9 |
| | PP6 | 36.6 | 0.5 | 18.3 | 0.9 |
| | PP7 | 54.6 | 0.9 | 49.1 | 0.9 |
| | PP8 | 15.3 | 1.7 | 26.0 | 0.9 |
| REFORMING MATERIAL (PE-BASED ELASTOMER) | TPE1 | 21.9 | 0.5 | 10.9 | 0.861 |
| | TPE2 | — | 3.6 | — | 0.864 |
| | TPE3 | — | 3.6 | — | 0.885 |
| | TPE4 | — | 0.5 | — | 0.863 |
| REFORMING MATERIAL (OTHER) | TPE5 | — | 3.0 | — | 0.87 |
| | TPE6 | 8 | 2.0 | 16 | 0.898 |
| | TPE7 | — | 0.8 | — | 0.89 |

Example 1

The base material resin was obtained by mixing 75 wt % of virgin resin of PP1, 20 wt % of virgin resin of PP2, and 5 wt % of virgin resin of TPE1 were mixed with each other.

The base material resin consisting of only virgin resin was extruded in molten state from a predetermined extruder, and then solidified under the following conditions. Thus, a sample with one cycle of thermal history (test piece) was obtained. Specifically, the rotational speed of the screw in the extruder was 60 rpm, and the shape of the extrusion opening was a slit shape measuring 25 mm×1 mm. The temperature in the extrusion device was adjusted to about 220° C. to 230° C. so that the extrusion output was within the range of about 20 kg/h before the resin was extruded from the extrusion opening. The extruded sheet of resin was sandwiched between metal plates, cooled, and solidified.

After the sample with one cycle of thermal history was obtained, all of the solidified resin material was pulverized without adding virgin resin, obtaining the recovered resin material. Only the recovered resin material was extruded from the 25 mm extruder in molten state, and then solidified. In this way, a sample with two cycles of thermal history was obtained. After the sample with two cycles of thermal history was obtained, all of the solidified sample with two cycles of thermal history was pulverized without adding virgin resin, thus obtaining recovered resin material. Only this recovered resin material was extruded from the 25 mm extruder in molten state, and then solidified. In this way, a sample with three cycles of thermal history was obtained.

Example 2

The base material resin was obtained by mixing 50 wt % of virgin resin of PP1, 45 wt % of virgin resin of PP2, and 5 wt % of virgin resin of TPE1 with each other.

The subsequent steps were performed by the same method as for example 1, obtaining a sample with one cycle of thermal history and a sample with three cycles of thermal history.

Example 3

The base material resin was obtained by mixing 20 wt % of virgin resin of PP1, 75 wt % of virgin resin of PP2, and 5 wt % of virgin resin of TPE1 with each other.

The subsequent steps were performed by the same method as for example 1, obtaining a sample with one cycle of thermal history and a sample with three cycles of thermal history.

Example 4

The base material resin was obtained by mixing 95 wt % of virgin resin of PP2 with 5 wt % of virgin resin of TPE1.

The subsequent steps were performed by the same method as for example 1, obtaining a sample with one cycle of thermal history and a sample with three cycles of thermal history.

Example 5

The base material resin was obtained by mixing 77.4 wt % of virgin resin of PP1, 20.6 wt % of virgin resin of PP2, and 2 wt % of virgin resin of TPE1 with each other.

The subsequent steps were performed by the same method as for example 1, obtaining a sample with one cycle of thermal history and a sample with three cycles of thermal history.

Example 6

The base material resin was obtained by mixing 67.5 wt % of virgin resin of PP1, 22.5 wt % of virgin resin of PP2, 10 wt % of virgin resin of TPE1 with each other.

The subsequent steps were performed by the same method as for example 1, obtaining a sample with one cycle of thermal history and a sample with three cycles of thermal history.

Example 7

The base material resin was obtained by mixing 60 wt % of virgin resin of PP1, 20 wt % of virgin resin of PP2, and 20 wt % of virgin resin of TPE1 with each other.

The subsequent steps were performed by the same method as for example 1, obtaining a sample with one cycle of thermal history and a sample with three cycles of thermal history.

Example 8

The base material resin was obtained by mixing 75 wt % of virgin resin of PP1, 20 wt % of virgin resin of PP3, and 5 wt % of virgin resin of TPE1 with each other.

The subsequent steps were performed by the same method as for example 1, obtaining a sample with one cycle of thermal history and a sample with three cycles of thermal history.

Example 9

The base material resin was obtained by mixing 75 wt % of virgin resin of PP1, 20 wt % of virgin resin of PP4, and 5 wt % of virgin resin of TPE1 with each other.

The subsequent steps were performed by the same method as for example 1, obtaining a sample with one cycle of thermal history and a sample with three cycles of thermal history.

Example 10

The base material resin was obtained by mixing 75 wt % of virgin resin of PP1, 20 wt % of virgin resin of PP5, and 5 wt % of virgin resin of TPE1 with each other.

The subsequent steps were performed by the same method as for example 1, obtaining a sample with one cycle of thermal history and a sample with three cycles of thermal history.

Example 11

The base material resin was obtained by mixing 75 wt % of virgin resin of PP1, 20 wt % of virgin resin of PP6, and 5 wt % of virgin resin of TPE1 with each other.

The subsequent steps were performed by the same method as for example 1, obtaining a sample with one cycle of thermal history and a sample with three cycles of thermal history.

Example 12

The base material resin was obtained by mixing 75 wt % of virgin resin of PP1, 20 wt % of virgin resin of PP7, and 5 wt % of virgin resin of TPE1 with each other.

The subsequent steps were performed by the same method as for example 1, obtaining a sample with one cycle of thermal history and a sample with three cycles of thermal history.

Example 13

The base material resin was obtained by mixing 75 wt % of virgin resin of PP1, 20 wt % of virgin resin of PP8, and 5 wt % of virgin resin of TPE1 with each other.

The subsequent steps were performed by the same method as for example 1, obtaining a sample with one cycle of thermal history and a sample with three cycles of thermal history.

Example 14

The base material resin was obtained by mixing 75 wt % of virgin resin of PP1, 20 wt % of virgin resin of PP2, and 5 wt % of virgin resin of TPE2 with each other.

The subsequent steps were performed by the same method as for example 1, obtaining a sample with one cycle of thermal history and a sample with three cycles of thermal history.

Example 15

The base material resin was obtained by mixing 75 wt % of virgin resin of PP1, 20 wt % of virgin resin of PP2, and 5 wt % of virgin resin of TPE3 with each other.

The subsequent steps were performed by the same method as for example 1, obtaining a sample with one cycle of thermal history and a sample with three cycles of thermal history.

Example 16

The base material resin was obtained by mixing 75 wt % of virgin resin of PP1, 20 wt % of virgin resin of PP2, and 5 wt % of virgin resin of TPE4 with each other.

The subsequent steps were performed by the same method as for example 1, obtaining a sample with one cycle of thermal history and a sample with three cycles of thermal history.

Comparative Example 1

The base material resin was obtained by mixing 80 wt % of virgin resin of PP1 with 20 wt % of virgin resin of PP2.

The subsequent steps were performed by the same method as for example 1, obtaining a sample with one cycle of thermal history and a sample with three cycles of thermal history.

Comparative Example 2

The base material resin was obtained by mixing 75 wt % of virgin resin of PP1, 20 wt % of virgin resin of PP2, and 5 wt % of virgin resin of TPE5 with each other.

The subsequent steps were performed by the same method as for example 1, obtaining a sample with one cycle of thermal history and a sample with three cycles of thermal history.

Comparative Example 3

The base material resin was obtained by mixing 75 wt % of virgin resin of PP1, 20 wt % of virgin resin of PP2, and 5 wt % of virgin resin of TPE6 with each other.

The subsequent steps were performed by the same method as for example 1, obtaining a sample with one cycle of thermal history and a sample with three cycles of thermal history.

Comparative Example 4

The base material resin was obtained by mixing 75 wt % of virgin resin of PP1, 20 wt % of virgin resin of PP2, and 5 wt % of virgin resin of TPE7 with each other.

The subsequent steps were performed by the same method as for example 1, obtaining a sample with one cycle of thermal history and a sample with three cycles of thermal history.

Comparative Example 5

The base material resin was obtained by mixing 67.5 wt % of virgin resin of PP1, 22.5 wt % of virgin resin of PP2, and 10 wt % of virgin resin of TPE7 with each other.

The subsequent steps were performed by the same method as for example 1, obtaining a sample with one cycle of thermal history and a sample with three cycles of thermal history.

Comparative Example 6

The base material resin was obtained by mixing 60 wt % of virgin resin of PP1, 20 wt % of virgin resin of PP2, and 20 wt % of virgin resin of TPE7 with each other.

The subsequent steps were performed by the same method as for example 1, obtaining a sample with one cycle of thermal history and a sample with three cycles of thermal history.

The physical properties of the samples with one cycle of thermal history and the samples with three cycles of thermal history according to examples 1 to 16 and comparative examples 1 to 6 were evaluated as follows.

The MT indicates the following tension. Namely, the tension was the exerted tension measured with the melt tension tester (manufactured by Toyo Seiki Seisaku-Sho, Ltd.) when a strand extruded from an orifice with a diameter of 2.095 mm and a length of 8 mm at a residual heat temperature of 230° C. and an extrusion rate of 5.7 mm/min was wound on a roller with a diameter of 50 mm at a winding rate of 100 rpm.

The MFR indicates values measured according to JIS K-7210 at a test temperature of 230° C. and with a test load of 2.16 kg.

The degradation degree is (MT×MFR in the sample with three cycles of thermal history)/(MT×MFR in the sample with one cycle of thermal history).

The Izod impact strength is measured as follows. A wall portion of a sample that has been cut out is stored at −30° C., and then a test piece measuring 80×10 (length in mm×width in mm) with a thickness of 4 mm is cut out of the wall portion. The Izod impact strength is measured using overlapping test pieces according to JIS K-7110 (with notches).

The Izod displacement is (Izod impact strength in the sample with three cycles of thermal history)/(Izod impact strength in the sample with one cycle of thermal history).

Table 2 shows, with regard to examples 1 to 16 and comparative examples 1 to 6, the compounding ratio of PP1 to PP8 and TPE1 to TPE7 in the base material resin, and MT, MFR, MT×MFR, degradation degree, Izod impact strength (IZOD), and Izod displacement (IZOD displacement) that were evaluated as set forth above of each of the samples with one cycle of thermal history and the samples with three cycles of thermal history.

TABLE 2

| | | EX. 1 | EX. 2 | EX. 3 | EX. 4 | EX. 5 | EX. 6 | EX. 7 | COMP. 1 | EX. 8 | EX. 9 | EX. 10 | EX. 11 |
|---|---|---|---|---|---|---|---|---|---|---|---|---|---|
| PRIMARY FOAM MATERIAL | PP1 | 75 | 50 | 20 | 0 | 77.4 | 67.5 | 60 | 80 | 75 | 75 | 75 | 75 |
| DILUTING MATERIAL | PP2 | 20 | 45 | 75 | 95 | 20.6 | 22.5 | 20 | 20 | | | | |
| | PP3 | | | | | | | | | 20 | | | |
| | PP4 | | | | | | | | | | 20 | | |
| | PP5 | | | | | | | | | | | 20 | |
| | PP6 | | | | | | | | | | | | 20 |
| | PP7 | | | | | | | | | | | | |
| | PP8 | | | | | | | | | | | | |
| REFORMING MATERIAL (PE-BASED ELASTOMER) | TPE1 | 5 | 5 | 5 | 5 | 2 | 10 | 20 | 0 | 5 | 5 | 5 | 5 |
| | TPE2 | | | | | | | | | | | | |
| | TPE3 | | | | | | | | | | | | |
| | TPE4 | | | | | | | | | | | | |
| REFORMING MATERIAL (OTHER) | TPE5 | | | | | | | | | | | | |
| | TPE6 | | | | | | | | | | | | |
| | TPE7 | | | | | | | | | | | | |
| MT (1 CYCLE OF THERMAL HISTORY) | | 89.80 | 74.90 | 44.00 | 13.80 | 86.00 | 79.71 | 76.10 | 86.82 | 71.30 | 77.30 | 82.20 | 106.60 |
| MFR (1 CYCLE OF THERMAL HISTORY) | | 4.74 | 2.30 | 2.00 | 2.24 | 4.24 | 3.50 | 3.34 | 4.13 | 4.38 | 4.10 | 3.51 | 1.83 |

TABLE 2-continued

| | | | | | | | | | | | |
|---|---|---|---|---|---|---|---|---|---|---|---|
| MT × MFR (1 CYCLE OF THERMAL HISTORY) | 426 | 172 | 88 | 31 | 365 | 279 | 254 | 359 | 312 | 317 | 289 | 195 |
| MT (3 CYCLES OF THERMAL HISTORY) | 25.80 | 23.60 | 17.70 | 10.20 | 24.80 | 22.20 | 20.40 | 23.15 | 21.70 | 23.70 | 19.40 | 35.00 |
| MFR (3 CYCLES OF THERMAL HISTORY) | 7.03 | 4.46 | 3.32 | 2.76 | 6.75 | 5.80 | 5.22 | 6.65 | 8.02 | 7.52 | 6.38 | 3.75 |
| MT × MFR (3 CYCLES OF THERMAL HISTORY) | 181 | 105 | 59 | 28 | 167 | 129 | 106 | 154 | 174 | 178 | 124 | 131 |
| DEGRADATION DEGREE | 42.61% | 61.10% | 66.78% | 91.07% | 45.91% | 46.15% | 41.90% | 42.93% | 55.73% | 56.23% | 42.90% | 67.28% |
| IZOD DISPLACEMENT (1 CYCLE OF THERMAL HISTORY) | 2.5 | 3.1 | 4.1 | 4.3 | 1.7 | 4.3 | 11.8 | 1.6 | 2.0 | 2.1 | 2.7 | 2.0 |
| IZOD DISPLACEMENT (3 CYCLES OF THERMAL HISTORY) | 2.6 | 3.2 | 4.2 | 5.4 | 1.5 | 5.4 | 8.8 | 1.4 | 2.2 | 2.6 | 2.7 | 2.4 |
| IZOD DISPLACEMENT(%) | 104% | 103% | 102% | 126% | 88% | 126% | 75% | 88% | 110% | 124% | 100% | 120% |
| OVERALL EVALUATION | B | B | B | B | C | B | C | D | B | B | B | B |

| | | EX. 12 | EX. 13 | EX. 14 | EX. 15 | EX. 16 | COMP. 2 | COMP. 3 | COMP. 4 | COMP. 5 | COMP. 6 |
|---|---|---|---|---|---|---|---|---|---|---|---|
| PRIMARY FOAM MATERIAL | PP1 | 75 | 75 | 75 | 75 | 75 | 75 | 75 | 75 | 67.5 | 60 |
| DILUTING MATERIAL | PP2 | | | 20 | 20 | 20 | 20 | 20 | 20 | 22.5 | 20 |
| | PP3 | | | | | | | | | | |
| | PP4 | | | | | | | | | | |
| | PP5 | | | | | | | | | | |
| | PP6 | | | | | | | | | | |
| | PP7 | 20 | | | | | | | | | |
| | PP8 | | 20 | | | | | | | | |
| REFORMING MATERIAL (PE-BASED ELASTOMER) | TPE1 | 5 | 5 | | | | | | | | |
| | TPE2 | | | 5 | | | | | | | |
| | TPE3 | | | | 5 | | | | | | |
| | TPE4 | | | | | 5 | | | | | |
| REFORMING MATERIAL (OTHER) | TPE5 | | | | | | 5 | | | | |
| | TPE6 | | | | | | | 5 | | | |
| | TPE7 | | | | | | | | 5 | 10 | 20 |
| MT (1 CYCLE OF THERMAL HISTORY) | | 107.10 | 85.40 | 85.70 | 86.12 | 86.30 | 87.24 | 85.40 | 84.20 | 77.25 | 74.37 |
| MFR (1 CYCLE OF THERMAL HISTORY) | | 1.55 | 2.69 | 4.57 | 4.61 | 4.52 | 4.55 | 4.70 | 4.12 | 3.87 | 4.04 |
| MT × MFR (1 CYCLE OF THERMAL HISTORY) | | 166 | 230 | 392 | 397 | 390 | 397 | 401 | 347 | 299 | 300 |
| MT (3 CYCLES OF THERMAL HISTORY) | | 38.90 | 30.80 | 25.12 | 24.85 | 26.02 | 24.93 | 23.85 | 23.22 | 20.12 | 19.98 |
| MFR (3 CYCLES OF THERMAL HISTORY) | | 3.38 | 5.75 | 7.12 | 7.24 | 6.76 | 6.80 | 7.07 | 6.33 | 5.87 | 5.49 |
| MT × MFR (3 CYCLES OF THERMAL HISTORY) | | 131 | 177 | 179 | 180 | 176 | 170 | 169 | 147 | 118 | 110 |
| DEGRADATION DEGREE | | 79.20% | 77.09% | 45.67% | 45.32% | 45.09% | 42.71% | 42.01% | 42.37% | 39.51% | 36.51% |
| IZOD DISPLACEMENT (1 CYCLE OF THERMAL HISTORY) | | 2.0 | 2.4 | 3.9 | 3.3 | 2.2 | 2.1 | 3.9 | 2.7 | 5.5 | 8.8 |
| IZOD DISPLACEMENT (3 CYCLES OF THERMAL HISTORY) | | 2.1 | 2.6 | 4.7 | 4 | 2.5 | 1.9 | 3.4 | 2.4 | 5.8 | 10.2 |
| IZOD DISPLACEMENT(%) | | 105% | 108% | 121% | 121% | 114% | 90% | 87% | 89% | 105% | 116% |
| OVERALL EVALUATION | | B | B | A | A | B | D | D | D | D | D |

In the samples according to examples 1 to 16, the base material resin is the mixture resin of a polypropylene-based resin mixed with the reforming material including a polyethylene-based elastomer.

In the sample according to comparative example 1, the base material resin has a material composition using only polypropylene-based resin and no reforming material.

In the samples according to examples 1 to 16, the base material resin is the mixture resin with the above material compositions, whereby the Izod impact strength is increased from 1.4 kJ/m$^2$ of the sample according to comparative example 1. Thus, there was obtained the result that, compared with the case of the material composition having no reforming material being mixed, the Izod impact strength is not degraded.

Further, in the samples according to examples 1 to 16, MT×MFR was such that (MT×MFR in the test piece with three cycles of thermal history)/(MT×MFR in the test piece with one cycle of thermal history)≥0.4. Thus, there was obtained the result that with regard to the test piece with three cycles of thermal history too, a decrease in MT×MFR can be suppressed compared with the test piece with one cycle of thermal history.

Thus, in the samples according to examples 1 to 16, there was obtained the result that even when subjected to many thermal histories, the Izod impact strength is not degraded and a decrease in MT×MFR can be suppressed compared with the case of the material composition having no reforming material being mixed.

When the foam-molded article is mass-produced by blow molding, as set forth above, the production process is repeated where portions of the resin material that has been placed in molten state and then solidified other than the finished article are pulverized to obtain recovered resin material, and where blow molding is repeated while mixing virgin resin into the recovered resin material. Thus, in the resin material of the samples according to examples 1 to 16, there was obtained the result that, even in the case of such mass production in particular, a stable, high-quality foam-molded article can be produced at low cost, and that high impact resistance can be expected.

Of the samples according to examples 1 to 16, particularly in the samples according to examples 1 to 4, 6, and 8 to 16, the compounding ratio of the polyethylene-based elastomer as the reforming material is 3% to 15% by weight of the mixture resin.

Thus, in the samples according to these examples 1 to 4, 6, and 8 to 16, there was obtained the result that the Izod impact strength in the test piece with three cycles of thermal history is not lowered below the Izod impact strength of the test piece with one cycle of thermal history.

In the case of the samples according to examples 5 and 7, there was obtained the result that the Izod impact strength in the test piece with three cycles of thermal history became lower than the Izod impact strength in the test piece with one cycle of thermal history. Thus, in Table 2, the overall evaluation is "C".

Of the samples according to examples 1 to 4, 6, and 8 to 16, particularly in the samples according to examples 14 and 15, the polyethylene-based elastomer used as the reforming material has the MFR of 3 or more at 190° C.

Thus, in the samples according to examples 14 and 15, there was obtained the result that all three of the following conditions are satisfied.

(1) The Izod impact strength in the test piece with three cycles of thermal history is higher than the Izod impact strength in the test piece with one cycle of thermal history.

(2) The Izod impact strength in the test piece with three cycles of thermal history is 4.0 kJ/m$^2$ or more.

(3) MT×MFR in the test piece with three cycles of thermal history is 160 mN·g/10 min or more.

As described in (1), because the Izod impact strength in the test piece with three cycles of thermal history is higher than the Izod impact strength in the test piece with one cycle of thermal history, there was obtained the result that, even when the foam-molded article is mass-produced by adding recovered resin material into the base material resin, sufficiently high impact resistance can be expected.

As described in (2), because the Izod impact strength in the test piece with three cycles of thermal history is 4.0 kJ/m$^2$ or more, mass production of the foam-molded article having sufficient impact resistance even at low temperature can be realized. Further, even when the expansion ratio is increased, impact resistance at low temperature is sufficiently ensured. Thus, mass production of the lightweight foam-molded article with excellent impact resistance at low temperature can be realized.

As described in (3), because MT×MFR in the test piece with three cycles of thermal history is 160 mN·g/10 min or more, there was obtained the result that, even when recovered resin material is included in the base material resin, molding property is not excessively degraded. Thus, when the resin material in molten state is foamed and extruded, the expansion ratio is not excessively lowered by defoaming of the foamed cells, whereby the foam-molded article with a high expansion ratio can be mass-produced.

Hence, even when the mold surface has large irregularities, the resin material can readily conform to the irregularities. Thus, there was obtained the result that high quality molding can be expected without pinholes even in the case of a foam-molded article having more complex irregularities.

Further, the development of drawdown can be suppressed when the resin material in molten state is extruded, thus enabling stable mass production.

In the samples according to examples 1 to 4, 6, 8 to 13, and 16, there was not obtained the result of satisfying all of the conditions (1) to (3) simultaneously. Thus, their overall evaluations in Table 2 are "B".

With regard to the samples according to examples 14 and 15, the overall evaluation in Table 2 is "A".

Of the samples according to examples 14 and 15, particularly in the sample according to example 14, the polyethylene-based elastomer as the reforming material employs TPE2 whose density is less than 0.87 g/cm$^3$.

Thus, in the sample according to example 14, there was obtained the result that, in addition to all of the conditions (1) to (3) being satisfied, the following condition is satisfied.

(4) The Izod impact strength in the test piece with three cycles of thermal history is 4.5 kJ/m$^2$ or more.

Thus, the foam-molded article that has even better impact resistance at low temperature can be mass-produced.

On the other hand, in the samples according to comparative examples 2 to 6, the base material resin is a mixture resin where a polypropylene-based resin is mixed with the other reforming material that is not a polyethylene-based elastomer.

By using the mixture resin of such material composition as the base material resin, with regard to the samples according to comparative examples 2 to 4, there was obtained the result that, compared with the sample according to comparative example 1 where the reforming material is not mixed, the degradation degree of (MT×MFR in the test piece with three cycles of thermal history)/(MT×MFR in the test piece with one cycle of thermal history) deteriorated even more.

In the samples according to comparative examples 5 and 6, there was obtained the result that (MT×MFR in the test piece with three cycles of thermal history)/(MT×MFR in the test piece with one cycle of thermal history) was lower than 0.4.

As set forth above, in the samples according to comparative examples 2 to 6, the results became worse due to the mixture of the reforming material.

When, as in the sample according to comparative example 1, a material composition that is not mixed with reforming material was used, there was obtained the result that the Izod impact strength became lower than in any of the samples according to examples 1 to 16 and comparative example 2 to 6 where the reforming material was used.

Thus, with regard to comparative examples 1 to 6, the overall evaluation in Table 2 is "D".

The present invention is not limited to lightweight air-conditioning ducts for vehicles, but may also be used for automobiles, aircraft, vehicles/ships, building materials, or various electric device housings, or for structural members for sports or leisure purposes. When the present invention is used for interior panels such as cargo floor boards, deck boards, rear parcel shelves, roof panels, or door trims, or for automobile structural members such as door inner panels, platforms, hard tops, sun-roofs, hoods, bumpers, floor spacers, or tibia pads, the weight of the automobile can be reduced, whereby fuel economy can be increased.

DESCRIPTION OF REFERENCE SIGNS

10 Duct
21 Annular die
30 Clamping machine
31, 32 Split mold block
P Foamed parison

The invention claimed is:

1. A method for producing a foam-molded article comprising:
   preparing a resin material that is a mixture of:
      a virgin resin of a polypropylene-based resin; and
      a virgin resin of a reforming material including a polyethylene-based elastomer;
   obtaining a recovered resin material by pulverizing the resin material that has solidified after melting;
   obtaining a mixture resin by mixing the recovered resin material and the resin material that is a virgin resin without thermal history of melting;
   adding a foaming agent to the mixture resin; and
   clamping the mixture resin in molten state with split mold blocks,
   wherein the polyethylene-based elastomer has a compounding ratio of 3% to 15% by weight of the mixture resin.

2. The method for producing a foam-molded article according to claim 1, wherein
   the polyethylene-based elastomer has a melt flow rate (MFR) of 3 g/10 min or more at 190° C.

3. The method for producing a foam-molded article according to claim 1, wherein
   the polyethylene-based elastomer has a density of less than 0.87 g/cm$^3$.

4. A foam-molded article comprising a mixture resin including:
   a recovered resin that is made of a resin material prepared by mixing:
      a virgin resin of a polypropylene-based resin; and
      a virgin resin of a reforming material including a polyethylene-based elastomer, wherein the recovered resin being obtained by pulverizing the resin material that has solidified after melting; and
   a virgin resin that is the resin material without thermal history of melting,
   wherein the polyethylene-based elastomer has a compounding ratio of 3% to 15% by weight of the mixture resin.

5. The method for producing a foam-molded article according to claim 2, wherein the polyethylene-based elastomer has a density of less than 0.87 g/cm$^3$.

6. The foam-molded article according to claim 4, wherein the polyethylene-based elastomer has a density of less than 0.87 g/cm$^3$.

* * * * *